United States Patent
Heo et al.

(10) Patent No.: US 10,742,968 B2
(45) Date of Patent: Aug. 11, 2020

(54) APPARATUS FOR RECOGNIZING PUPILLARY DISTANCE FOR 3D DISPLAY

(71) Applicant: Samsung Electronics Co., Ltd., Suwon-si, Gyeonggi-do (KR)

(72) Inventors: Jingu Heo, Yongin-si (KR); Seok Lee, Hwaseong-si (KR); Juyong Park, Seongnam-si (KR); Dong Kyung Nam, Yongin-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 135 days.

(21) Appl. No.: 14/741,306

(22) Filed: Jun. 16, 2015

(65) Prior Publication Data
US 2016/0156896 A1 Jun. 2, 2016

(30) Foreign Application Priority Data
Dec. 1, 2014 (KR) .................. 10-2014-0170006

(51) Int. Cl.
*H04N 13/398* (2018.01)
*H04N 13/376* (2018.01)
*H04N 13/371* (2018.01)
*H04N 13/327* (2018.01)
*H04N 13/302* (2018.01)

(52) U.S. Cl.
CPC ......... *H04N 13/398* (2018.05); *H04N 13/302* (2018.05); *H04N 13/327* (2018.05); *H04N 13/371* (2018.05); *H04N 13/376* (2018.05)

(58) Field of Classification Search
CPC .......... H04N 13/0014; H04N 13/0484; H04N 13/0497; H04N 13/0278; H04N 13/0402; H04N 13/0477; H04N 13/0472; H04N 13/0425
USPC ............................................. 345/156; 463/32
See application file for complete search history.

(56) References Cited

U.S. PATENT DOCUMENTS

| 5,061,996 A | * | 10/1991 | Schiffman | B60R 1/00 340/980 |
| 9,470,911 B2 | * | 10/2016 | Fonte | G06F 16/22 |
| 2008/0044063 A1 | * | 2/2008 | Friedman | A61B 3/1216 382/117 |

(Continued)

FOREIGN PATENT DOCUMENTS

| KR | 100704634 | 4/2007 |
| KR | 20120039712 A | 4/2012 |

(Continued)

*Primary Examiner* — Calvin C Ma
(74) *Attorney, Agent, or Firm* — Harness, Dickey & Pierce, P.L.C.

(57) ABSTRACT

An apparatus for recognizing a pupillary distance for three-dimensional (3D) display includes a display configured to output a 3D image corresponding to a reference pupillary distance, a controller configured to control a viewing cone included in the 3D image, and a user inputter configured to receive a user feedback indicating whether an artifact is viewed in the 3D image in response to the controlling of the viewing cone. The controller may move the viewing cone within a margin corresponding to the reference pupillary distance, and change the reference pupillary distance or determine the reference pupillary distance to be a desired pupillary distance of the user based on the user feedback.

15 Claims, 12 Drawing Sheets

(56) References Cited

U.S. PATENT DOCUMENTS

| | | | | |
|---|---|---|---|---|
| 2010/0208942 A1* | 8/2010 | Porter | .................. | H04N 13/122 382/106 |
| 2011/0075257 A1* | 3/2011 | Hua | .................... | G02B 27/017 359/464 |
| 2011/0122329 A1* | 5/2011 | Broughton | ......... | G02B 27/2214 349/15 |
| 2011/0298795 A1* | 12/2011 | Van Der Heijden | | H04N 13/0011 345/419 |
| 2012/0050502 A1* | 3/2012 | Chi | .................... | H04N 13/0497 348/51 |
| 2012/0200495 A1* | 8/2012 | Johansson | ............... | G06F 3/011 345/156 |
| 2012/0268715 A1 | 10/2012 | Stark et al. | | |
| 2013/0178287 A1* | 7/2013 | Yahav | .................... | G02B 27/01 463/32 |
| 2014/0028662 A1* | 1/2014 | Liao | .................. | H04N 13/0402 345/419 |
| 2014/0098198 A1 | 4/2014 | Lee et al. | | |
| 2014/0152956 A1* | 6/2014 | Silva | ........................ | A61B 3/111 351/204 |
| 2014/0274391 A1* | 9/2014 | Stafford | .................. | G06F 3/013 463/32 |
| 2014/0293021 A1* | 10/2014 | Yu | ...................... | H04N 13/0425 348/51 |
| 2015/0243085 A1* | 8/2015 | Newhouse | ............ | G06T 19/006 345/633 |
| 2015/0286069 A1* | 10/2015 | Allione | ................. | G01M 11/025 351/159.75 |
| 2015/0304640 A1* | 10/2015 | Brooks | ................. | H04N 13/111 348/56 |
| 2015/0350637 A1* | 12/2015 | Noguchi | ............ | H04N 13/0022 348/54 |

FOREIGN PATENT DOCUMENTS

| | | |
|---|---|---|
| KR | 20120077741 A | 7/2012 |
| KR | 20120115014 A | 10/2012 |
| KR | 20130000231 A | 1/2013 |
| KR | 20130068851 A | 6/2013 |
| KR | 20130133520 A | 12/2013 |

* cited by examiner

APPARATUS FOR RECOGNIZING PUPILLARY DISTANCE FOR 3D DISPLAY

CROSS-REFERENCE TO RELATED APPLICATION

This application claims the priority benefit of Korean Patent Application No. 10-2014-0170006, filed on Dec. 1, 2014, in the Korean Intellectual Property Office, the entire contents of which are incorporated herein by reference in its entirety.

BACKGROUND

1. Field

At least one example embodiment relates to an apparatus for recognizing a pupillary distance.

2. Description of the Related Art

Continuous progress has been made in three-dimensional (3D) display technology. In the 3D display technology, a 3D display may include a glasses-type display and a glassless-type display. The glassless-type display outputs a 3D image to each of a left eye and a right eye of a user.

For such a glassless-type display, a pupillary distance of the user is a salient element. An existing method of measuring a pupillary distance includes a method of physically measuring the pupillary distance using a tool such as a ruler and a method of measuring the pupillary distance by capturing a face of the user along with a general object, such as a credit card.

The existing method may involve errors and fail to provide a convenient measuring environment. Thus, technology for measuring a pupillary distance more accurately and conveniently is necessary.

SUMMARY

Some example embodiments relate to a method of recognizing a pupillary distance.

In some example embodiments, the method may include generating a three-dimensional (3D) image associated with a reference pupillary distance, and determining a desired pupillary distance of a user based on a user feedback on the 3D image.

The user feedback indicates whether an artifact is viewed in the 3D image.

The method may further include changing the reference pupillary distance in response to the artifact being viewed in the 3D image.

The method may further include determining an optimal viewing zone corresponding to the reference pupillary distance, and controlling a viewing cone included in the 3D image within the optimal viewing zone.

The method may further include determining an optimal viewing zone based on the user feedback, and the determining of the pupillary distance may include determining a pupillary distance corresponding to the determined optimal viewing zone to be the pupillary distance of the user.

The method may further include controlling a viewing cone included in the 3D image based on a control command received from the user.

Other example embodiments relate to an apparatus for recognizing a pupillary distance.

In some example embodiments, the apparatus may include a 3D image generator configured to generate a 3D image associated with a reference pupillary distance, and a pupillary distance determiner configured to determine a desired pupillary distance of a user based on a user feedback on the 3D image.

The 3D image generator may generate a 3D image corresponding to a reference pupillary distance, and the pupillary distance determiner may determine the pupillary distance of the user based on the user feedback indicating whether an artifact is viewed in the 3D image.

The apparatus may further include a viewing cone controller configured to control a viewing cone included in the 3D image, and the viewing cone controller may control the viewing cone within an optimal viewing zone corresponding to a reference pupillary distance.

The apparatus may further include a viewing zone determiner configured to determine an optimal viewing zone based on the user feedback, and the pupillary distance determiner may determine a pupillary distance corresponding to the determined optimal viewing zone to be the pupillary distance of the user.

The apparatus may further include a viewing cone controller configured to control a viewing cone included in the 3D image based on a control command received from the user.

Other example embodiments relate to an apparatus for recognizing a pupillary distance.

In some example embodiments, the apparatus may include a display configured to output a 3D image corresponding to a reference pupillary distance, a controller configured to control a viewing cone included in the 3D image, and a user inputter configured to receive a user feedback indicating whether an artifact is viewed in the 3D image in response to the controlling of the viewing cone. The controller may determine a pupillary distance of a user based on the user feedback.

The controller may determine an optimal viewing zone based on the reference pupillary distance and positions of eyes of the user, and control the viewing cone within the optimal viewing zone.

The controller may change the reference pupillary distance based on the user feedback.

The controller may control the viewing cone based on a control command of the user, determine an optimal viewing zone based on the user feedback, and determine a pupillary distance corresponding to the determined optimal viewing zone to be the pupillary distance of the user.

The control command may be used to move at least one of a left image and a right image of the viewing cone.

The user feedback may relate to a margin in which the artifact is viewable by the user when the eyes of the user deviate from the optimal viewing zone, and the controller may determine the margin based on the user feedback and determine a viewing zone corresponding to the margin to be the optimal viewing zone.

The controller may control the viewing cone by moving a virtual eye position of the viewing cone.

The viewing cone may include a left viewing cone to be radiated to a left eye of the user and a right viewing cone to be radiated to a right eye of the user, and the controller may control the viewing cone by sequentially controlling the left viewing cone and the right viewing cone.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION OF EXAMPLE EMBODIMENTS

Figure 1:
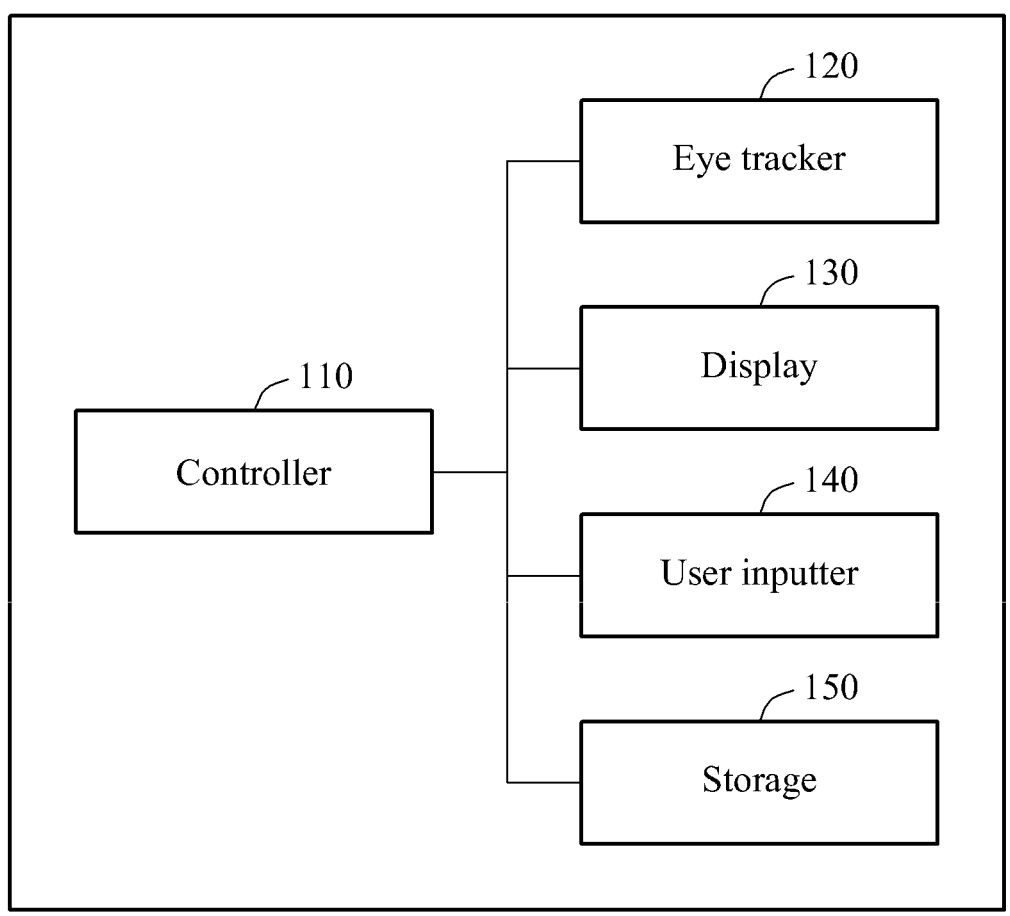
FIG. 1 is a diagram illustrating an example of an apparatus for recognizing a pupillary distance for three-dimensional (3D) display according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

FIG. 1 is a diagram illustrating an example of an apparatus for recognizing a pupillary distance (or a distance between the centers of pupils in each of a person's eyes) for three-dimensional (3D) display according to at least one example embodiment. Hereinafter, the apparatus for recognizing a pupillary distance will be simply referred to as a pupillary distance recognizing apparatus 100.

Referring to FIG. 1, the pupillary distance recognizing apparatus 100 includes a controller 110, an eye tracker 120, a display 130, a user inputter 140, and a storage 150. The pupillary distance recognizing apparatus 100 measures a pupillary distance of a user based on a user feedback received from the user.

The eye tracker 120 tracks eyes of the user. The eye tracker 120 may include an image sensor, and sense an image of the user using the image sensor and track the eyes of the user from the sensed image of the user.

The eye tracker 120 may detect a face of the user from the image of the user, and detect the eyes of the user from the detected face of the user. The eye tracker 120 may detect the eyes of the user based on data trained on various shapes of faces and eyes, and relative locations of each face and eyes. The eye tracker 120 may output, as coordinate values, positions of the detected eyes of the user.

The eye tracker 120 may track the eyes of the user in a 3D space with x-y-z axes. The eye tracker 120 may output the eyes of the user as 3D coordinate values.

The display 130 outputs a 3D image corresponding to a reference pupillary distance.

The display 130 may output the 3D image by dividing the 3D image into an image for a left eye and an image for a right eye of the user and radiating the images to the respective eyes. The display 130 may output the 3D image to the positions of the detected eyes of the user. The display 130 may radiate the image for the left eye to the detected left eye of the user and the image for the right eye to the detected right eye of the user. The display 130 may be a 3D display device provided in a type of a parallax barrier or lenticular lens.

The 3D image may include a static image and a video. When measuring the pupillary distance of the user, the 3D image may be a 3D pattern used to measure the pupillary distance. For example, the 3D image may be a pattern in which a plurality of vertical lines is horizontally arranged. When the pupillary distance of the user is determined, the 3D image may be a 3D content such as, for example, a photograph, a television program, and a movie.

The reference pupillary distance may be a pupillary distance on which the 3D image to be output from the display 130 is based. The display 130 may output respective 3D images corresponding to various reference pupillary distances. When the reference pupillary distance is changed, an optimal viewing zone may be changed. The optimal viewing zone may refer to a zone within which the user may view the 3D image without an artifact (or with a reduced artifact). The optimal viewing zone may vary depending on a pupillary distance of a user. Thus, when the optimal viewing zone is determined, a pupillary distance corresponding to the optimal viewing zone may be determined to be the pupillary distance of the user.

The optimal viewing zone may be determined using various methods. In an example, the pupillary distance recognizing apparatus 100 may sequentially output 3D images for various optimal viewing zones, and determine an optimal viewing zone for the user based on the user feedback. For example, when an optimal viewing zone corresponding to a reference pupillary distance of 65 millimeters (mm) is referred to as a first optimal viewing zone and an optimal viewing zone corresponding to a reference pupillary distance of 70 mm is referred to as a second optimal viewing zone, and the user views an artifact of the 3D image in the first optimal viewing zone and does not view the artifact of the 3D image in the second optimal viewing zone, the pupillary distance of the user may be determined to be 70 mm. Hereinafter, scenario 1 will describe a case in which the pupillary distance recognizing apparatus 100 sequentially outputs 3D images for various optimal viewing zones.

In another example, the user may input, to the pupillary distance recognizing apparatus 100, the user feedback indicating that an artifact is viewed at a point in time at which the artifact is viewed while the user is controlling a viewing cone. The pupillary distance recognizing apparatus 100 may determine an irradiation angle of the viewing cone at which the artifact is viewable based on the user feedback, and determine the optimal viewing zone based on the irradiation angle. The pupillary distance recognizing apparatus 100 may determine a pupillary distance corresponding to the determined optimal viewing zone to be the pupillary distance of the user. Hereinafter, scenario 2 will describe a case in which the user inputs the user feedback while the user is controlling the viewing cone.

An operation or a definition of a parameter may be differently described in scenario 1 and scenario 2. Detailed descriptions associated with scenario 1 and scenario 2 will be provided hereinafter.

<Scenario 1: Determination of a Reference Pupillary Distance>

In scenario 1, the user may change the reference pupillary distance in response to the artifact being viewed, and determine a pupillary distance optimal for the user to be the pupillary distance of the user. The user may select, from among various reference pupillary distances, a reference pupillary distance with which the 3D image is most appropriately viewed to be the pupillary distance of the user. In an absence of a reference pupillary distance set by the user, a default value of the reference pupillary distance may be set as 65 mm.

<Scenario 2: Determination of a Reference Pupillary Distance>

In scenario 2, the reference pupillary distance may indicate a default reference pupillary distance. The user may input, to the pupillary distance recognizing apparatus 100, the user feedback indicating whether the artifact is viewed while the user is controlling a viewing cone of a 3D image corresponding to the default reference pupillary distance. The reference pupillary distance will be further described with reference to FIG. 2.

Figure 2:
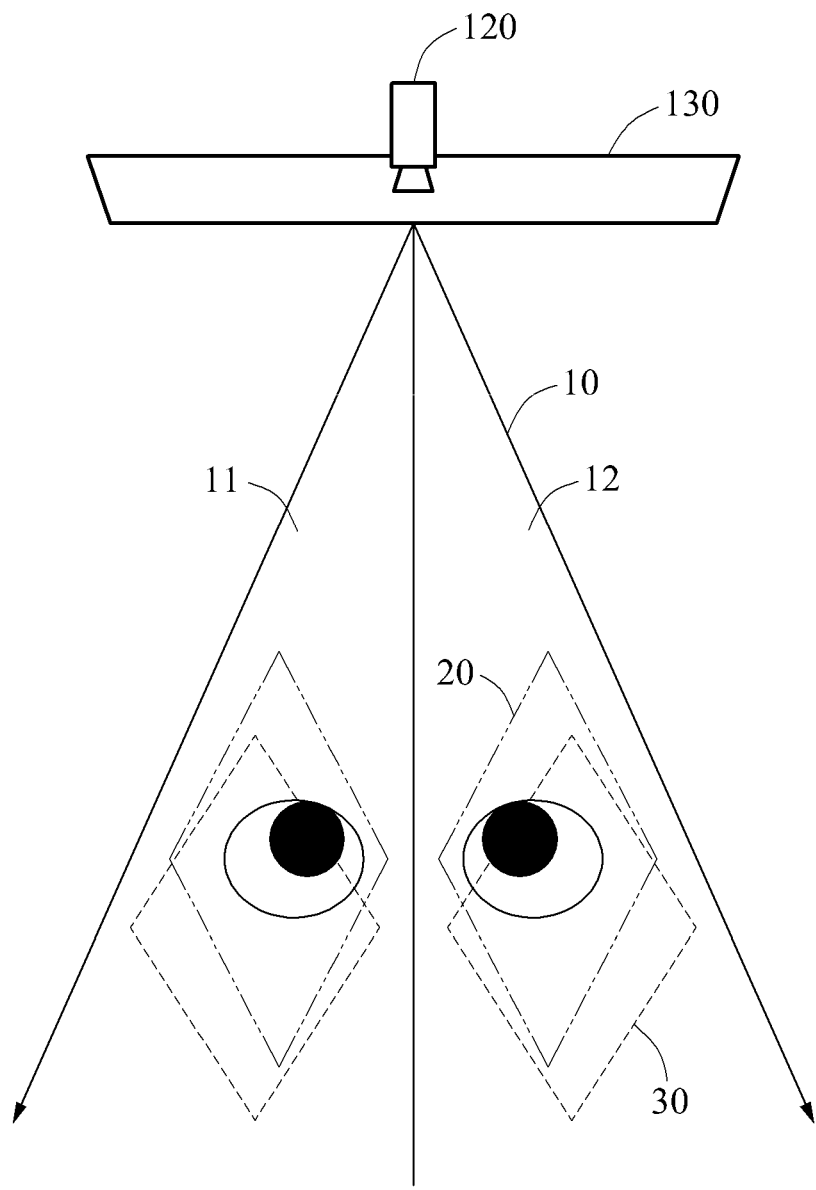
FIG. 2 illustrates an example of a viewing cone and a pupillary distance according to at least one example embodiment.

FIG. 2 illustrates an example of a viewing cone 10 and a pupillary distance according to at least one example embodiment.

In FIG. 2, also illustrated are an eye tracker 120, a display 130, the viewing cone 10, an optimal viewing zone 20 corresponding to a first reference pupillary distance, and an optimal viewing zone 30 corresponding to a second reference pupillary distance.

A 3D image to be output from the display 130 may include at least one viewing cone. Referring to FIG. 2, the viewing cone 10 includes a left viewing cone 11 to be radiated to a left eye of a user and a right viewing cone 12 to be radiated to a right eye of the user.

An optimal viewing zone may vary depending on a pupillary distance of a user. The optimal viewing zone may refer to a zone in which the 3D image may be viewed without an artifact. A user having the first reference pupillary distance as a pupillary distance of the user may have the optimal viewing zone 20. Similarly, a user having the second reference pupillary distance as a pupillary distance of the user may have the optimal viewing zone 30. For example, the first reference pupillary distance may be 65 mm, and the second reference pupillary distance may be 70 mm.

A pupillary distance illustrated in FIG. 2 is the first reference pupillary distance. The display 130 may output a 3D image corresponding to the first reference pupillary distance. That is, the viewing cone 10 may correspond to the first reference pupillary distance. Thus, the user having the first reference pupillary distance as the pupillary distance of the user may view the 3D image without an artifact within the optimal viewing zone 20.

For example, as illustrated in FIG. 2, when the display 130 outputs a 3D image corresponding to the second reference pupillary distance, the user having the first reference pupillary distance as the pupillary distance of the user may view the artifact because eyes of the user having the first reference pupillary distance deviate from the optimal viewing zone 20. Thus, the user may need to set the 3D image to be output from the display 130 to be suitable for the pupillary distance of the user to view the 3D image without the artifact.

The display 130 may output 3D images corresponding to various reference pupillary distances in addition to the 3D images corresponding to the optimal viewing zones 20 and 30. Thus, various optimal viewing zones may exist in addition to the optimal viewing zones 20 and 30. Each of the optimal viewing zones may correspond to a certain reference pupillary distance.

Referring back to FIG. 1, the user inputter 140 receives the user feedback from the user on a result of viewing the 3D image. The user inputter 140 may receive the user feedback indicating whether the artifact is viewed in the 3D image in response to the controlling of the viewing cone 10. In addition, the user inputter 140 may receive a control command from the user to control the viewing cone 10.

The user inputter 140 may be provided in various forms of a device to receive a user input including the user feedback and the control command. For example, the user inputter 140 may receive a user input through a remote controller, a touch-type inputter, an image recognizer, a voice recognizer, a keyboard, or a mouse.

The user feedback may differ in scenario 1 and scenario 2. The user feedback may have different definitions in scenario 1 and scenario 2, as detailed below.

<Scenario 1: a User Feedback>

In scenario 1, the user feedback may relate to whether an artifact is viewed in a 3D image. When a user views the artifact in the 3D image corresponding to a reference pupillary distance, the user feedback may indicate that the artifact is viewed. In addition, when the user does not view the artifact in the 3D image corresponding to the reference pupillary distance, the user feedback may indicate that the artifact is not viewed.

<Scenario 2: A User Feedback>

In scenario 2, the user feedback may relate to a margin used for determining an optimal (or desired) viewing zone. In detail, the user feedback may relate to the margin in which the artifact comes into view of the user when eyes of the user deviate from the optimal viewing zone. Here, the controller 110 may determine the margin based on the user feedback, and determine a viewing zone corresponding to the determined margin to be the optimal viewing zone.

A user interface may be provided to recognize a pupillary distance. The user interface may include a setting window to be described in detail with reference to FIGS. 7 and 8. The user interface may be provided by the pupillary distance recognizing apparatus 100, as described hereinafter.

The display 130 may output the 3D image corresponding to the reference pupillary distance and the setting window to adjust the 3D image.

The user inputter 140 may receive, from the user, the user feedback indicating whether the artifact is viewed in the 3D image. The user inputter 140 may receive the control command from the user to adjust the 3D image. The controller 110 may control the 3D image in response to the control command. The control command may be an input to move at least one of a left image and a right image. In response to the movement of the at least one of the left image and the right image, a width of at least one of a left viewing cone and a right viewing cone may be adjusted.

The controller 110 may determine the pupillary distance of the user based on the optimal viewing zone. A procedure for determining the optimal viewing zone may differ in scenario 1 and scenario 2.

<Scenario 1: Determination of an Optimal Viewing Zone>

In scenario 1, the controller 110 may determine an optimal viewing zone based on a reference pupillary distance and positions of eyes of a user. The controller 110 may control a viewing cone within a range in which the positions of the eyes do not deviate from the optimal viewing zone. The controller 110 may change the reference pupillary distance or determine the reference pupillary distance to be a pupillary distance of the user based on a user feedback.

<Scenario 2: Determination of an Optimal Viewing Zone>

In scenario 2, the controller 110 may control a 3D image based on a control command used to adjust the 3D image. The controller 110 may determine an optimal viewing zone based on a user feedback, and determine a pupillary distance corresponding to the optimal viewing zone to be a pupillary distance of a user. Here, the user feedback may relate to a margin in which an artifact is viewable by the user when eyes of the user deviate from the optimal viewing zone. The controller 110 may determine the margin based on the user feedback, and determine a viewing zone corresponding to the determined margin to be the optimal viewing zone.

The controller 110 may control the display 130 and the user inputter 140 to allow the display 130 and the user inputter 140 to perform the operations described in the foregoing. The user may measure a pupillary distance more conveniently and accurately through a pupillary distance recognizing apparatus 200 to be described in detail with reference to FIG. 6.

The controller 110 may determine the optimal viewing zone based on at least one of the reference pupillary distance and the positions of the eye of the user. The optimal viewing zone will be further described with reference to FIG. 3.

Figure 3:
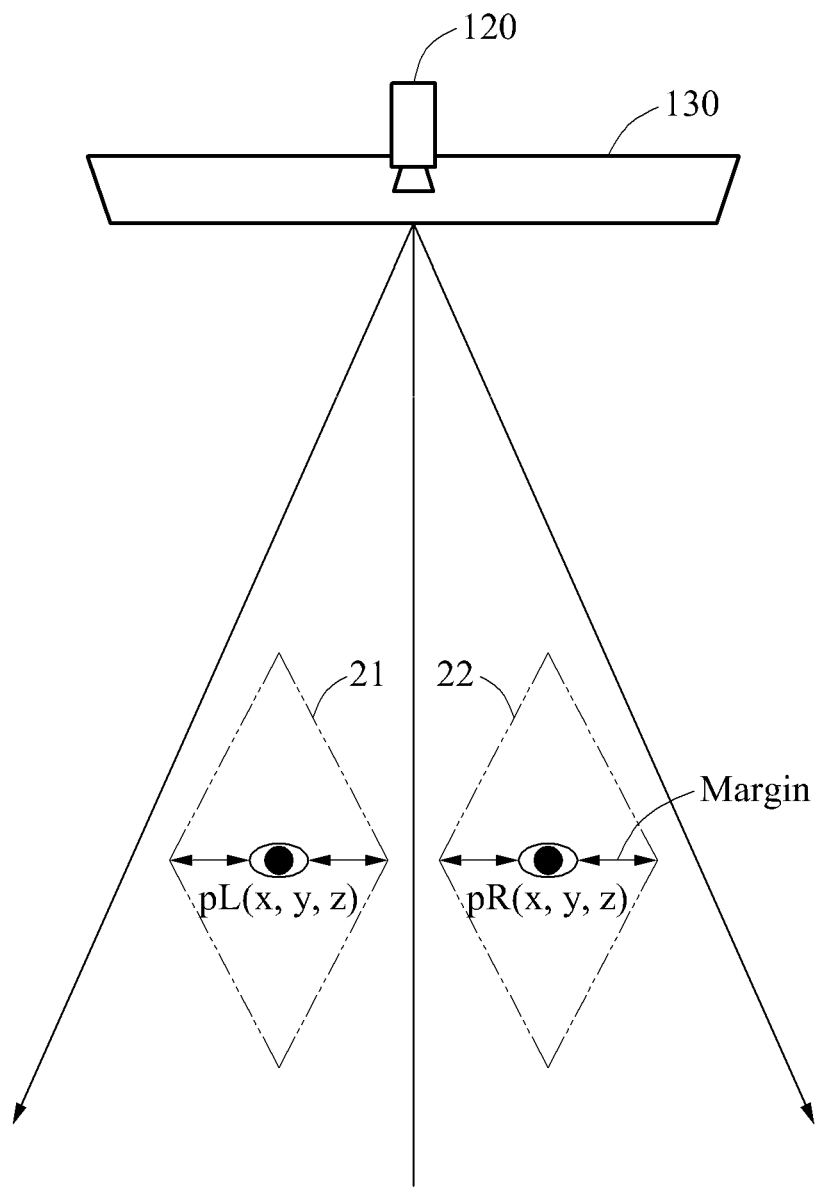
FIG. 3 illustrates an example of an optimal viewing zone according to at least one example embodiment.

FIG. 3 illustrates an example of an optimal viewing zone according to at least one example embodiment.

In FIG. 3, also illustrated are an eye tracker 120, a display 130, an optimal viewing zone 21 for a left image, an optimal viewing zone 22 for a right image, eyes of a user, and a margin.

The eye tracker 120 may track the eyes of the user and output coordinate values of the tracked eyes of the user. For example, the coordinate values of the eyes may include a pL(x, y, z) for a left eye and a pR(x, y, z) for a right eye.

The controller 110 may determine an optimal viewing zone and a margin of the optimal viewing zone based on a reference pupillary distance and positions of the eyes of the user. The margin may indicate a range within which the eyes may move without viewing an artifact of a 3D image. The margin may be within the optimal viewing zone corresponding to the reference pupillary distance.

The controller 110 may use the coordinate values of the eyes of the user to determine the margin. The controller 110 may determine the optimal viewing zone in which the 3D image is viewed without the artifact based on an irradiation angle of a left viewing cone and a right viewing cone. In addition, the controller 110 may determine an angle at which a viewing cone is movable based on a current irradiation angle of the viewing cone and the positions of the detected eyes of the user.

Referring back to FIG. 1, the controller 110 may control the viewing cone 10 of FIG. 2 included in a 3D image. The controller 110 may control a movement of the viewing cone 10. A method of controlling the viewing cone 10 may differ in scenario 1 and scenario 2.

<Scenario 1: Control of a Viewing Cone>

In scenario 1, the controller 110 may move the viewing cone 10 within a margin. The controller 110 may move the viewing cone 10 within a range in which positions of eyes of a user do not deviate from an optimal viewing zone. When the user views an artifact, a pupillary distance of the user may be determined not to correspond to a reference pupillary distance. The controller 110 may change the reference pupillary distance in response to a user feedback indicating that the artifact is viewed.

<Scenario 2: Control of a Viewing Cone>

In scenario 2, the controller 110 may move the viewing cone 10 based on a control command that is based on an input of a user. When positions of eyes of the user deviate from an optimal viewing zone in response to control of the viewing cone 10, the user may view an artifact. Here, the user may input a user feedback on a margin in which the artifact comes into view. The controller 110 may determine the margin based on the user feedback and determine a viewing zone corresponding to the determined margin to be the optimal viewing zone.

The viewing cone 10 may include a left viewing cone to be radiated to a left eye of the user and a right viewing cone to be radiated to a right eye of the user. The controller 110 may control at least one of the left viewing cone and the right viewing cone to control the viewing cone 10. The control of the viewing cone 10 will be further described with reference to FIGS. 4A through 5B.

Figure 4A:
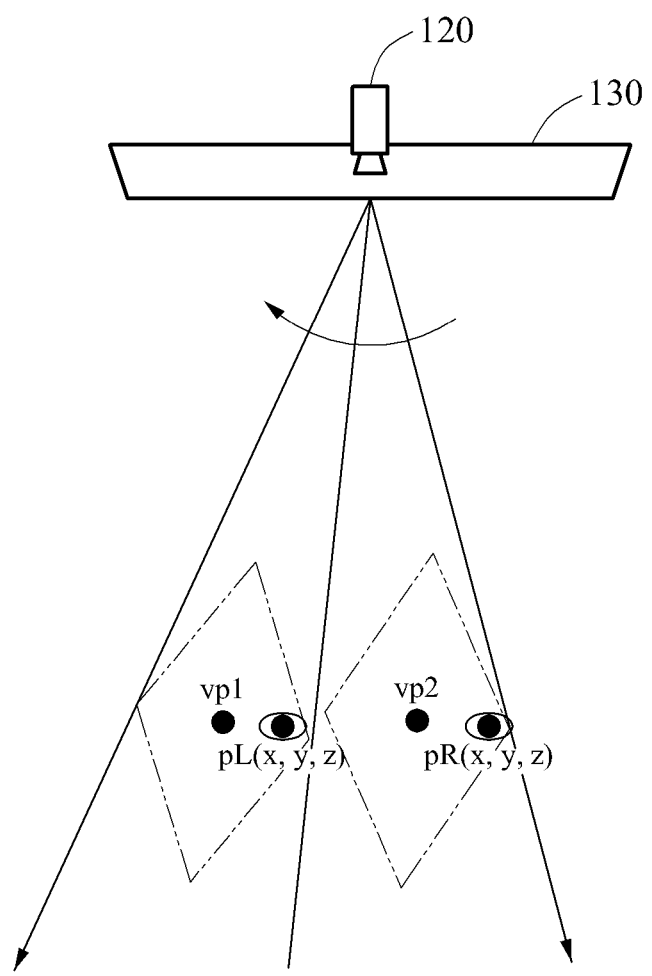
FIGS. 4A and 4B illustrate examples of an operation of controlling a viewing cone based on a movement of a virtual eye position according to at least one example embodiment.
Figure 4B:
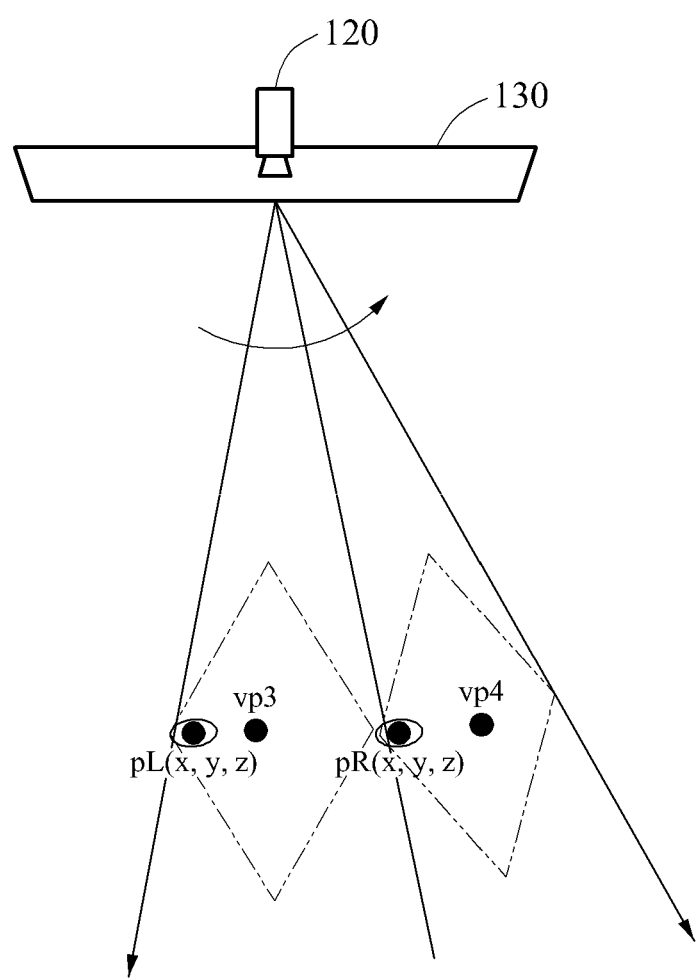

FIGS. 4A and 4B illustrate examples of an operation of controlling a viewing cone based on a movement of a virtual eye position according to at least one example embodiment.

In the examples of FIGS. 4A and 4B, also illustrated are an eye tracker 120, a display 130, eyes of a user, optimal viewing zones, and virtual positions of the eyes, for example, a first virtual position (vp1), a second virtual position (vp2), a third virtual position (vp3), and a fourth virtual position (vp4).

Referring to FIG. 4A, vp1 and vp2 are moved to a left side and thus, the viewing cone is moved to the left side. The controller 110 of FIG. 1 may move the viewing cone radiated to actual positions of the eyes, for example, pL(x, y, z) and pR(x, y, z), to allow the viewing cone to be radiated to vp1 and vp2. A control range of the viewing cone may differ in scenario 1 and scenario 2.

<Scenario 1: A Control Range of a Viewing Cone>

In scenario 1, the controller 110 may move the viewing cone to a leftmost side of a margin. When a user views an artifact during the moving of the viewing cone to the leftmost side of the margin, the controller 110 may determine that a currently set reference pupillary distance is not a pupillary distance of the user because the movement within the margin results in the viewing of the artifact. Thus, the controller 110 may change the reference pupillary distance based on a user feedback indicating that the artifact is viewed.

Referring to FIG. 4B, vp3 and vp4 are moved to a right side and thus, the viewing cone is moved to the right side. The controller 110 may move the viewing cone radiated to the actual positions of the eyes, for example, pL(x, y, z) and pR(x, y, z), to allow the viewing cone to be radiated to vp3 and vp4.

In scenario 1, the controller 110 may move the viewing cone to a rightmost side of the margin. When the user views an artifact during the moving of the viewing cone to the rightmost side of the margin, the controller 110 may determine that the currently set reference pupillary distance is not the pupillary distance of the user because the movement within the margin results in the viewing of the artifact. Thus, the controller 110 may change the reference pupillary distance based on the user feedback indicating that the artifact is viewed.

<Scenario 2: A Control Range of a Viewing Cone>

In scenario 2, the controller 110 may control the viewing cone by controlling virtual positions of eyes of a user to which the viewing cone is to be radiated in response to a control command of the user. When the viewing cone is moved to the left side as illustrated in FIG. 4A, the controller 110 may determine a left margin of an optimal viewing zone based on a user feedback on the margin.

In scenario 2, when the viewing cone is moved to the right side as illustrated in FIG. 4B, the controller 110 may determine a right margin of the optimal viewing zone based on the user feedback on the margin. The controller 110 may determine an optimal viewing zone based on the left margin and the right margin of the optimal viewing zone.

Figure 5A:
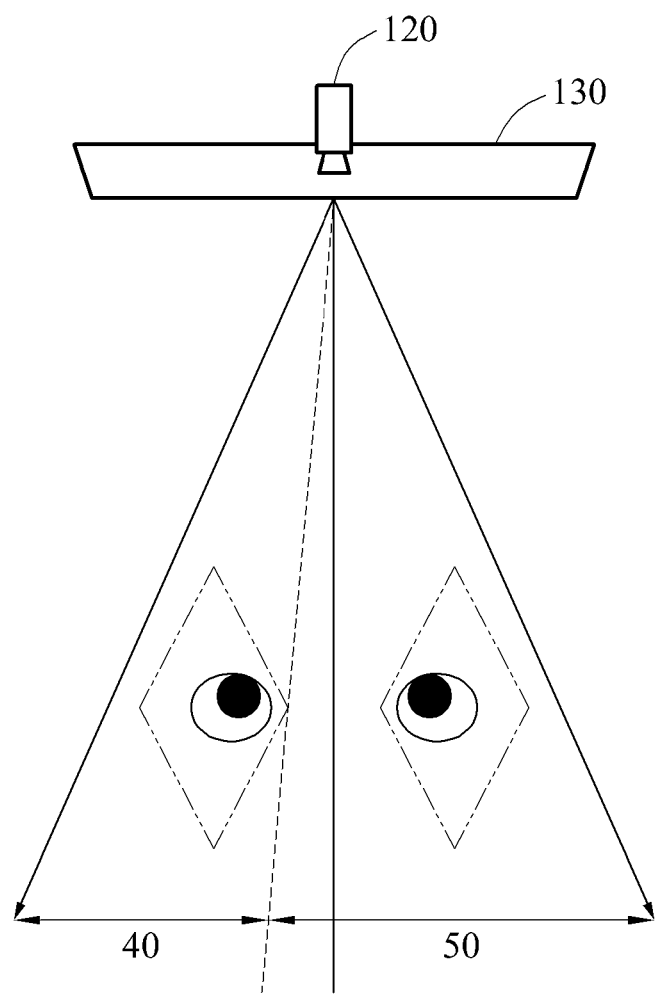
FIGS. 5A and 5B illustrate examples of an operation of controlling a left viewing cone and a right viewing cone according to at least one example embodiment.
Figure 5B:
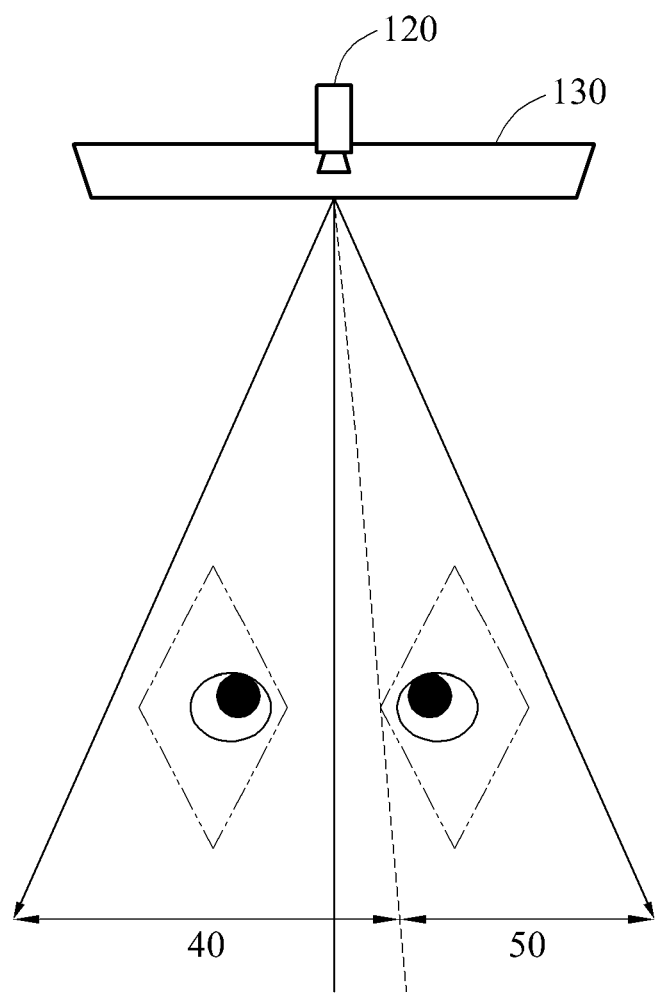

FIGS. 5A and 5B illustrate examples of an operation of controlling a left viewing cone 40 and a right viewing cone 50 according to at least one example embodiment.

In the examples of FIGS. 5A and 5B, also illustrated are an eye tracker 120, a display 130, eyes of a user, optimal viewing zones, the left viewing cone 40, and the right viewing cone 50. Each of the left viewing cone 40 and the right viewing cone 50 may be controlled by controlling any one of a left image and a right image. In such a case, a viewing cone may be fixed, and only widths of the left viewing cone 40 and the right viewing cone 50 may be controlled. Referring to FIG. 5A, a width of the right viewing cone 50 is broadened. Referring to FIG. 5B, a width of the left viewing cone 40 is broadened. The controller 110 of FIG. 1 may sequentially control the left viewing cone 40 and the right viewing cone 50.

The controller 110 may control the viewing cone to allow an optimal viewing zone corresponding to the left image to be included in the left viewing cone 40, and an optimal viewing zone corresponding to the right image to be included in the right viewing cone 50. A control range of the viewing cone may differ in scenario 1 and scenario 2.

<Scenario 1: Control Range of a Viewing Cone>

In scenario 1, when a user views an artifact during control of the viewing cone, the controller 110 may determine that a currently set reference pupillary distance is not a pupillary distance of the user because the optimal viewing zone corresponding to the left image being included in the left viewing cone 40 and the optimal viewing zone corresponding to the right image being included in the right viewing cone 50 results in the viewing of the artifact. Thus, the controller 110 may change the reference pupillary distance based on a user feedback indicating that the artifact is viewed.

<Scenario 2: A Control Range of a Viewing Cone>

In scenario 2, an inner margin of an optimal viewing zone may be determined based on a user feedback indicating that an artifact is viewed. The controller 110 may determine the optimal viewing zone based on the inner margin of the optimal viewing zone.

The controller 110 may control the viewing cone using at least one of the methods described with reference to FIGS. 4A through 5B.

The controller 110 may determine a pupillary distance of the user based on the user feedback. When the user views the artifact during the controller 110 controlling the viewing cone, the user may input the user feedback indicating that the artifact is viewed through the user inputter 140 of FIG. 1. A user input including such a user feedback and a control command may differ in scenario 1 and scenario 2.

<Scenario 1: A User Input>

In scenario 1, a user may input, through the user inputter 140, a user feedback to directly change a reference pupillary distance. When an artifact is not viewed during a viewing cone being controlled by the controller 110, the user may input the user feedback indicating that the artifact is not viewed through the user inputter 140. For example, the user may input, through the user inputter 140, a user feedback to directly determine the reference pupillary distance to be a pupillary distance of the user.

<Scenario 2: User Input>

In scenario 2, a user may directly control a viewing cone. For example, the user may control virtual positions of eyes of the user, a left viewing cone, or a right viewing cone based on a control command. The user inputter 140 may provide an interface environment to allow the user to control the viewing cone. In scenario 2, a user feedback may relate to a margin in which an artifact is viewable by the user when the eyes of the user deviate from an optimal viewing zone in response to control of the viewing cone.

When a pupillary distance of a user is determined, the display 130 of FIG. 1 may output a 3D image corresponding to the determined pupillary distance of the user. The 3D image may be 3D contents such as, for example, a photograph, a television program, and a movie.

The determined pupillary distance may be stored in the storage 150 of FIG. 1. The storage 150 may store the pupillary distance of the user matched to identification information of the user. For example, when a plurality of users uses the pupillary distance recognizing apparatus 100 of FIG. 1, the users and pupillary distances of the users may be distinguished based on identification information of each user. When a plurality of users sequentially views 3D contents, each user may view 3D contents suitable for a pupillary distance of the user by inputting identification information of the user to the pupillary distance recognizing apparatus 100.

The controller 110 may control the display 130, the user inputter 140, and the storage 150 to allow such components to perform respective operations described in the foregoing.

Figure 6:
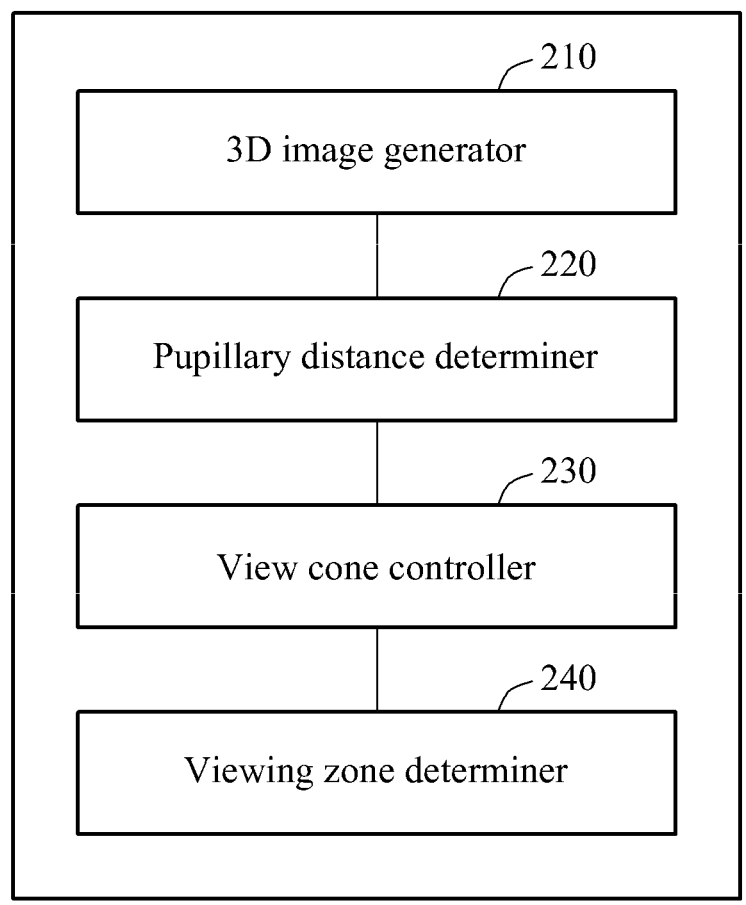
FIG. 6 is a diagram illustrating another example of an apparatus for recognizing a pupillary distance according to at least one example embodiment.

FIG. 6 is a diagram illustrating another example of a pupillary distance recognizing apparatus 200 according to at least one example embodiment.

Referring to FIG. 6, the pupillary distance recognizing apparatus 200 includes a 3D image generator 210, a pupillary distance determiner 220, a viewing cone controller 230, and a viewing zone determiner 240. The 3D image generator 210, the pupillary distance determiner 220, the viewing cone controller 230, and the viewing zone determiner 240 may be provided in at least one processor or in a form of a software module. For a description of the pupillary distance recognizing apparatus 200, reference may be made to the descriptions provided in the foregoing.

The 3D image generator 210 may generate a 3D image associated with a pupillary distance. The pupillary distance determiner 220 may determine a pupillary distance of a user based on a user feedback on the 3D image. Operations of the 3D image generator 210, the pupillary distance determiner 220, the viewing cone controller 230, and the viewing zone determiner 240 may differ in scenario 1 and scenario 2. Hereinafter, the operations of the 3D image generator 210, the pupillary distance determiner 220, the viewing cone controller 230, and the viewing zone determiner 240 will be described based on scenario 1 and scenario 2.

<Scenario 1>

The 3D image generator 210 may generate a 3D image corresponding to a reference pupillary distance. The reference pupillary distance may be changed based on a user feedback.

The pupillary distance determiner 220 may determine a pupillary distance of a user based on a user feedback on the 3D image. The user feedback may relate to whether an artifact is viewed in the 3D image.

The viewing zone determiner 240 may determine an optimal viewing zone corresponding to the reference pupillary distance.

The viewing cone controller 230 may control a viewing cone included in the 3D image. The viewing cone controller 230 may control the viewing cone within the optimal viewing zone corresponding to the reference pupillary distance.

<Scenario 2>

The 3D image generator 210 may generate a 3D image corresponding to a reference pupillary distance. The reference pupillary distance may refer to a default pupillary distance.

A user may view the 3D image while controlling a viewing cone, and input a user feedback at a point in time at which an artifact is viewed in the 3D image.

The viewing cone controller 230 may control the viewing cone included in the 3D image based on a control command received from the user. The viewing zone determiner 240 may determine an optimal viewing zone based on the user feedback.

The pupillary distance determiner 220 may determine a pupillary distance corresponding to the optimal viewing zone to be a pupillary distance of the user.

A user interface may be provided to recognize a pupillary distance. The user interface will be further described with reference to FIGS. 7 and 8.

Figure 7:
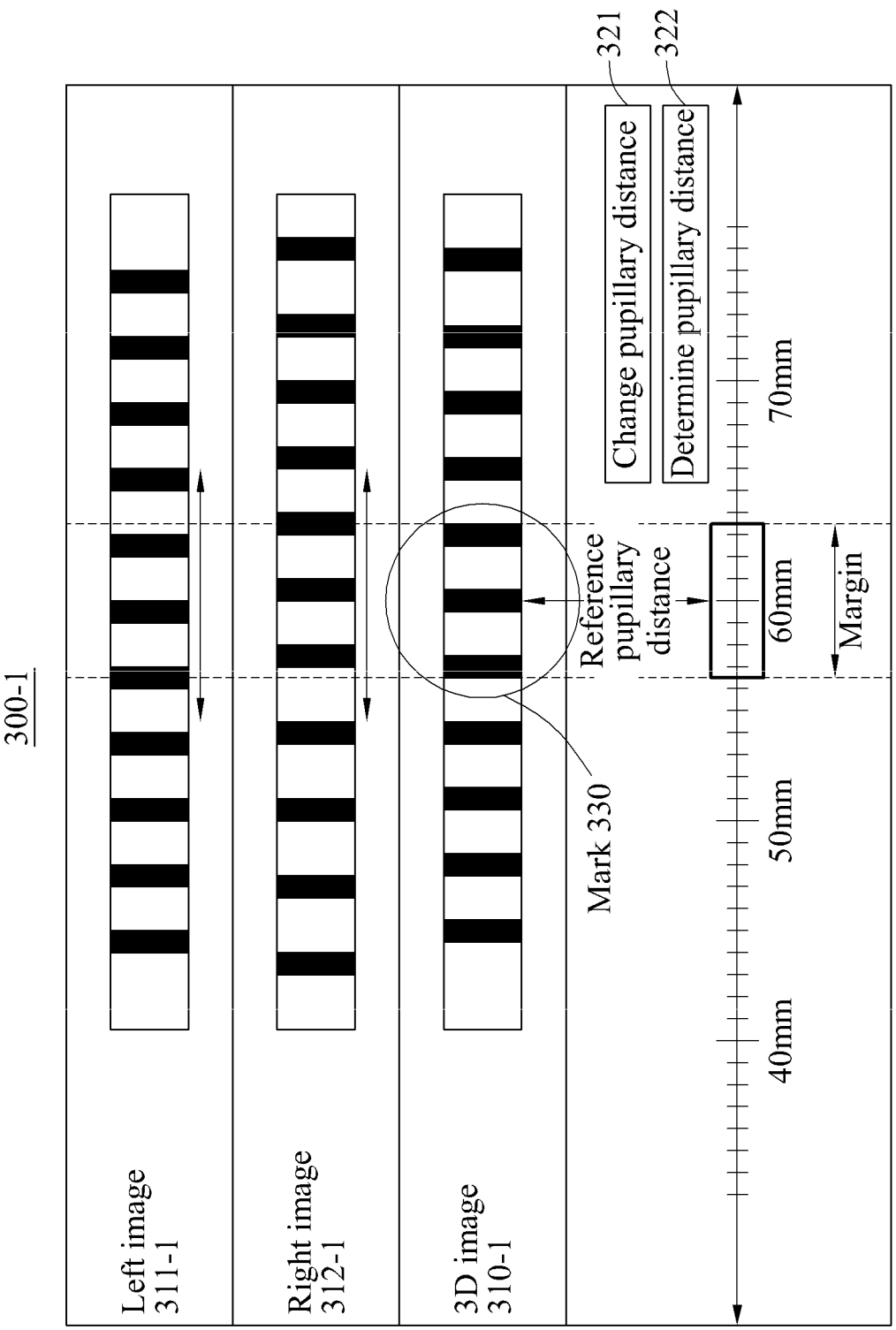
FIG. 7 illustrates an example of a configuration of a setting window to determine a pupillary distance based on control of a viewing cone by a controller according to at least one example embodiment.

FIG. 7 illustrates an example of a configuration of a setting window 300-1 used to determine a pupillary distance based on control of a viewing cone by a controller according to at least one example embodiment.

Referring to FIG. 7, the setting window 300-1 includes a 3D image 310-1, a left image 311-1, a right image 312-1, a button 321 for changing a pupillary distance, a button 322 for determining a pupillary distance, a mark 330, a reference pupillary distance, and a margin.

The setting window 300-1 may include at least one of the left image 311-1 of the 3D image 310-1 to be radiated to a left eye of a user, the right image 312-1 of the 3D image 310-1 to be radiated to a right eye of the user, and the 3D image 310-1. The left image 311-1 and the right image 312-1 may move to a left and right direction based on a direction indicated in the setting window 300-1. The left image 311-1 and the right image 312-1 may move to the left and right direction based on control by the controller 110 of FIG. 1. The left image 311-1 and the right image 312-1 may move simultaneously or sequentially. The left image 311-1 and the right image 312-1 may move within the margin. The margin may be indicated in the setting window 300-1.

The setting window 300-1 may include various selection buttons having respective functions. The setting window 300-1 may include the button 321 to change a reference pupillary distance and the button 322 to determine the reference pupillary distance to be a pupillary distance of the user. The controller 110 may change the reference pupillary distance or determine the referenced pupillary distance to be the pupillary distance of the user based on a user feedback using the button 321 or the button 322.

The 3D image 310-1 may include the left image 311-1 and the right image 312-1. The user may view the 3D image 310-1 in a 3D state by viewing the left image 311-1 with the left eye of the user and the right image 312-1 with the right eye of the user.

In the 3D image 310-1, the mark 330 may be indicated to draw a gaze of the user. The user may measure a pupillary distance by viewing the mark 330.

The 3D image 310-1, the left image 311-1, and the right image 312-1 may include a plurality of vertical lines as illustrated in FIG. 7. The 3D image 310-1, the left image 311-1, and the right image 312-1 may be various patterns used to measure a pupillary distance.

Figure 8:
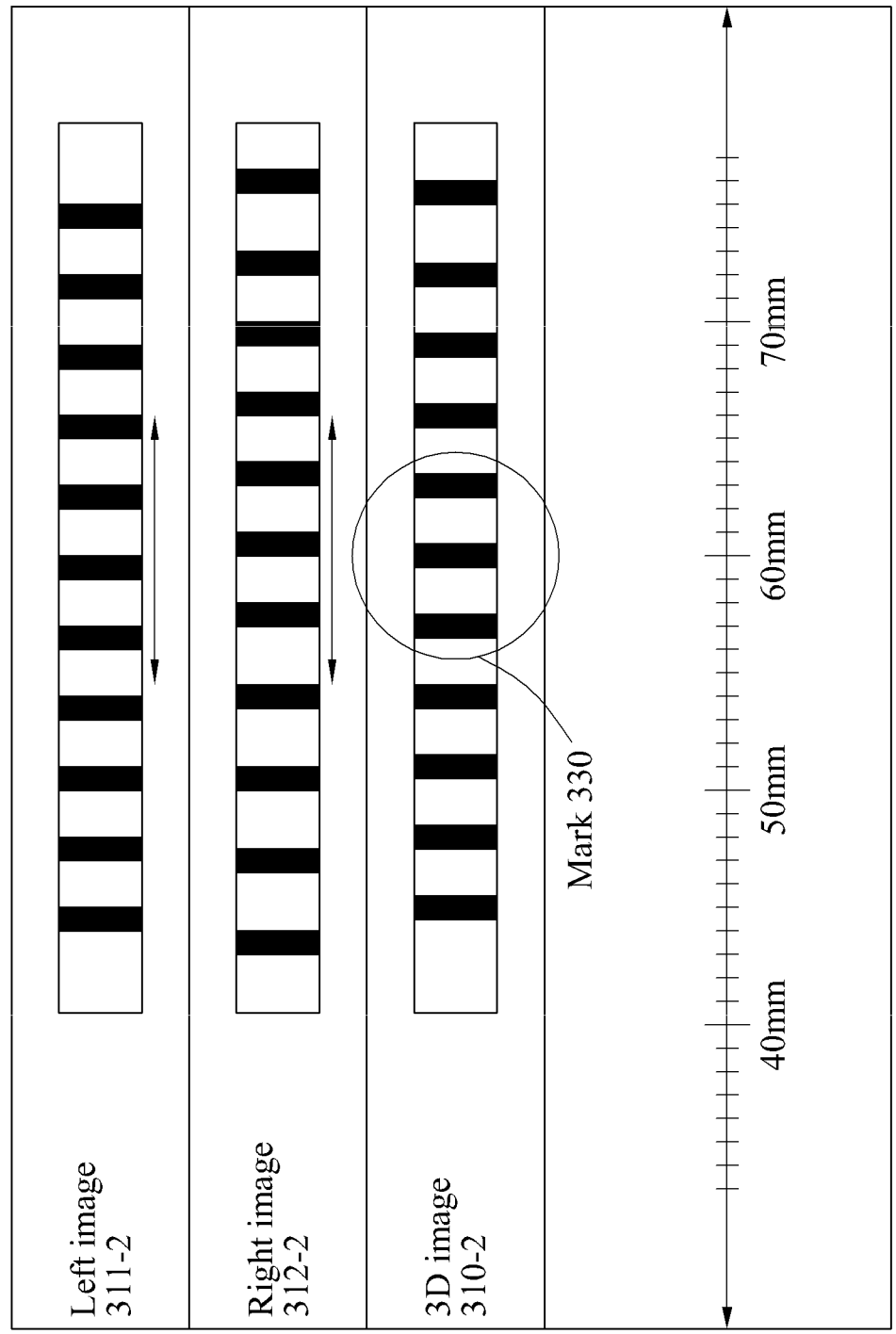
FIG. 8 illustrates an example of a configuration of a setting window to determine a pupillary distance based on control of a viewing cone by a user according to at least one example embodiment.

FIG. 8 illustrates an example of a configuration of a setting window 300-2 used to determine a pupillary distance based on control of a viewing cone by a user according to at least one example embodiment.

Referring to FIG. 8, the setting window 300-2 includes a 3D image 310-2, a left image 311-2, a right image 312-2, and a mark 330.

The user may control at least one of the left image 311-2 and the right image 312-2 through a control command. The control command may include, for example, a tap input, a touch and hold input, a double tap input, a drag input, a scroll input, a panning input, a flick input, a drag and drop input, a swipe input, and a pinch input. The control command may be the drag input or the scroll input, as a situation demands. The drag input or the scroll input may be performed through a keyboard, a mouse, a wheel of a remote control, a track ball, or a touch pad.

The setting window 300-2 may include at least one of the left image 311-2 of the 3D image 310-2 to be radiated to a left eye of the user, the right image 312-2 of the 3D image 310-2 to be radiated to a right eye of the user, and the 3D image 310-2. The left image 311-2 and the right image 312-2 may move to a left and right direction based on a direction indicated in the setting window 300-2 in response to the control command. The left image 311-2 and the right image 312-2 may move simultaneously or sequentially.

The setting window 300-2 may include various selection buttons having respective functions. The setting window 300-2 may include a button used to select a target image to be controlled to be at least one of the left image 311-2 and the right image 312-2. The setting window 300-2 may include a button used to determine positions of the left image 311-2 and the right image 312-2 to correspond to a margin of an optimal viewing zone. The controller 110 may control the left image 311-2 or the right image 312-2 in response to the control command of the user, and determine the optimal viewing zone based on a user feedback that determines the margin. The controller 110 may determine a pupillary distance corresponding to the determined optimal viewing zone to be a pupillary distance of the user.

In the 3D image 310-2, the mark 330 may be indicated to draw a gaze of the user. The user may measure a pupillary distance by viewing the mark 330.

The 3D image 310-2, the left image 311-2, and the right image 312-2 may include a plurality of vertical lines as illustrated in FIG. 8. The 3D image 310-2, the left image 311-2, and the right image 312-2 may be various patterns used to measure a pupillary distance.

The user may measure a pupillary distance more conveniently and accurately through the setting windows 300-1 and 300-2 illustrated in FIGS. 7 and 8.

Figure 9:
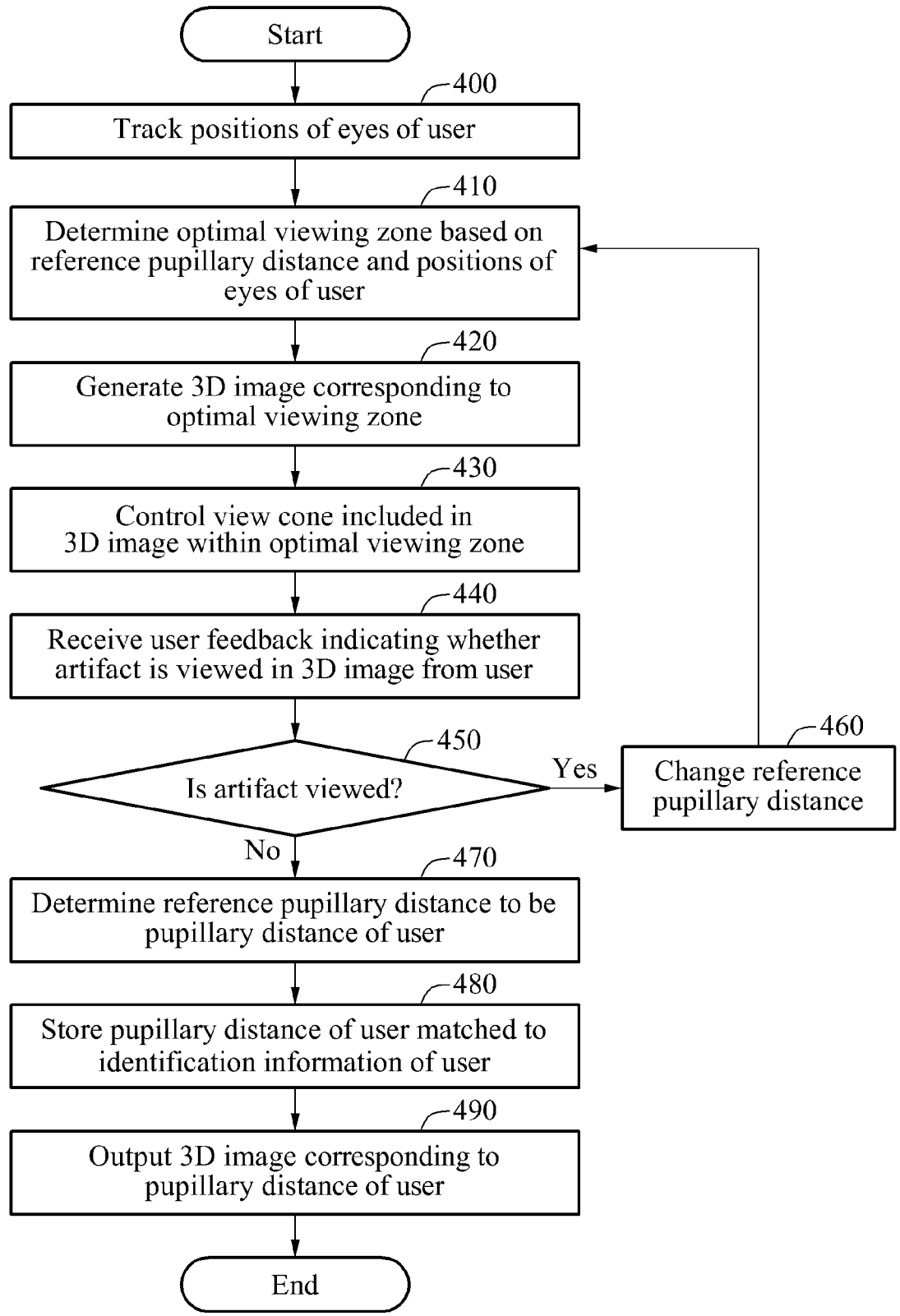
FIG. 9 is a flowchart illustrating an example of a method of recognizing a pupillary distance based on control of a viewing cone by a controller according to at least one example embodiment.
Figure 10:
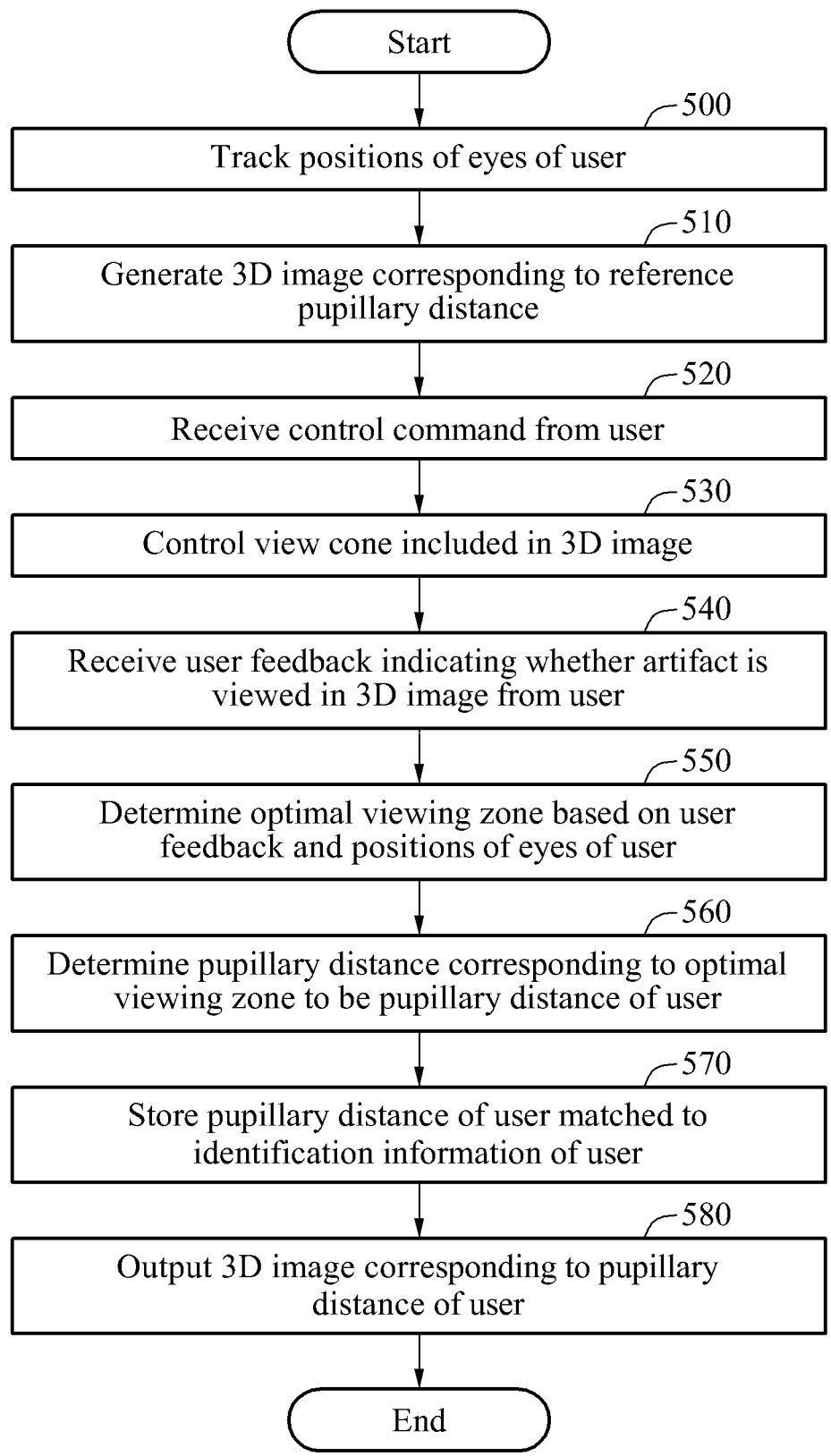
FIG. 10 is a flowchart illustrating an example of a method of recognizing a pupillary distance based on control of a viewing cone by a user according to at least one example embodiment.

Hereinafter, a method of recognizing a pupillary distance will be described with reference to flowcharts illustrated in FIGS. 9 and 10. FIG. 9 is a flowchart illustrating the method of recognizing a pupillary distance based on scenario 1, and FIG. 10 is a flowchart illustrating the method of recognizing a pupillary distance based on scenario 2.

FIG. 9 is a flowchart illustrating an example of a method of recognizing a pupillary distance based on control of a viewing cone by a controller according to at least one example embodiment. The method of recognizing a pupillary distance to be described hereinafter with reference to FIG. 9 is based on scenario 1 described in the foregoing.

Referring to FIG. 9, in operation 400, a pupillary distance recognizing apparatus 100 tracks positions of eyes of a user. The pupillary distance recognizing apparatus 100 may sense an image of the user using an eye tracker including an image sensor. The pupillary distance recognizing apparatus 100 may detect a face of the user from the image of the user, and detect the eyes of the user from the detected face of the user. The pupillary distance recognizing apparatus 100 may detect the eyes of the user based on data trained on various shapes of faces and eyes, or relative positions of the faces and the eyes. The pupillary distance recognizing apparatus 100 may output, as coordinate values, the positions of the detected eyes.

In operation 410, the pupillary distance recognizing apparatus 100 determines an optimal viewing zone based on a reference pupillary distance and the positions of the eyes of the user. The pupillary distance recognizing apparatus 100 may calculate the optimal viewing zone based on the reference pupillary distance and the positions of the detected eyes of the user. Alternatively, the pupillary distance recognizing apparatus 100 may pre-calculate optimal viewing zones corresponding to various reference pupillary distances and various positions of eyes, and select a viewing zone corresponding to the reference pupillary distance and the positions of the detected eyes of the user to be the optimal viewing zone from among the pre-calculated various viewing zones.

In operation 420, the pupillary distance recognizing apparatus 100 generates a 3D image corresponding to the optimal viewing zone. The generated 3D image may be output through a display. The pupillary distance recognizing apparatus 100 may output the 3D image by classifying the 3D image into an image for a left eye of the user and an image for a right eye of the user and radiating the images to the respective eyes. For example, the pupillary distance recognizing apparatus 100 may output the 3D image through a parallax barrier or a lenticular lens method. The 3D image may be a 3D pattern used to measure a pupillary distance. For example, the 3D image may be a pattern in which a plurality of vertical lines is horizontally arranged.

In operation 430, the pupillary distance recognizing apparatus 100 controls a viewing cone included in the 3D image. The pupillary distance recognizing apparatus 100 may control the viewing cone by moving the viewing cone within a margin determined based on the reference pupillary distance and the positions of the eyes of the user. The pupillary distance recognizing apparatus 100 may control the viewing cone by controlling a left viewing cone and a right viewing cone simultaneously or sequentially. Alternatively, the pupillary distance recognizing apparatus 100 may control the viewing cone by moving a virtual eye position of the viewing cone.

In operation 440, the pupillary distance recognizing apparatus 100 receives, from the user, a user feedback indicating whether an artifact is viewed in the 3D image. The pupillary distance recognizing apparatus 100 may receive the user feedback through a remote controller, a touch input device, an image recognizer, a voice recognizer, a keyboard, or a mouse. When the artifact is viewed by the user in the 3D image corresponding to the reference pupillary distance, the user feedback may be a feedback indicating that the artifact is viewed. When the artifact is not viewed by the user in the 3D image corresponding to the reference pupillary distance, the user feedback may be a feedback indicating that the artifact is not viewed.

In operation 450, the pupillary distance recognizing apparatus 100 determines whether the artifact is viewed based on the user feedback. When the artifact is viewed by the user, the pupillary distance recognizing apparatus may perform operation 460. Conversely, when the artifact is not viewed by the user, the pupillary distance recognizing apparatus may perform operation 470.

In operation 460, the pupillary distance recognizing apparatus 100 changes the reference pupillary distance. The pupillary distance recognizing apparatus 100 may increase or decrease the reference pupillary distance. A degree of the increase and the decrease may be adjusted by the user. The pupillary distance recognizing apparatus 100 may increase or decrease the reference pupillary distance based on a user input. The user input may include the degree of the increase and the decrease.

In operation 470, the pupillary distance recognizing apparatus 100 determines the reference pupillary distance to be a pupillary distance of the user. When the pupillary distance of the user is determined, the 3D image may be output based on the determined pupillary distance of the user.

In operation 480, the pupillary distance recognizing apparatus 100 matches the pupillary distance of the user to identification information of the user and stores the matched pupillary distance of the user. For example, when a plurality of users uses the pupillary distance recognizing apparatus, the users and pupillary distances of the users may be distinguished by identification information of the users. When the users sequentially view 3D contents, each user may view 3D contents suitable for a pupillary distance of the user by inputting identification information of the user to the pupillary distance recognizing apparatus.

In operation 490, the pupillary distance recognizing apparatus 100 outputs a 3D image corresponding to the pupillary distance of the user. The 3D image to be output in operation 490 may be 3D contents such as, for example, a photograph, a television program, and a movie.

The user may measure a pupillary distance more conveniently and accurately using the example methods. In addition, the user may view the 3D image optimal for the pupillary distance of the user and thus, a restriction on a movement may be relieved.

FIG. 10 is a flowchart illustrating an example of a method of recognizing a pupillary distance based on control of a viewing cone by a user according to at least one example embodiment. The method of recognizing a pupillary distance to be described hereinafter with reference to FIG. 10 is based on scenario 2 described in the foregoing.

Referring to FIG. 10, in operation 500, a pupillary distance recognizing apparatus 100 tracks positions of eyes of the user. The pupillary distance recognizing apparatus 100 may sense an image of the user using an eye tracker including an image sensor. The pupillary distance recognizing apparatus 100 may detect a face of the user from the image of the user, and detect the eyes of the user from the detected face of the user. The pupillary distance recognizing apparatus 100 may detect the eyes of the user based on data trained on various shapes of faces and eyes or relative positions of the faces and eyes. The pupillary distance recognizing apparatus 100 may output, as coordinate values, the positions of the detected eyes of the user.

In operation 520, the pupillary distance recognizing apparatus 100 generates a 3D image corresponding to a reference pupillary distance. The generated 3D image may be output through a display. Here, the reference pupillary distance may refer to a default pupillary distance, for example, 65 mm.

In operation 530, the pupillary distance recognizing apparatus 100 receives a control command from the user. The user may control at least one of a left image and a right image through the control command. The control command may include, for example, a tap input, a touch and hold input, a double tap input, a drag input, a scroll input, a panning input, a flick input, a drag and drop input, a swipe input, and a pinch input. The control command may be the drag input or the scroll input, as a situation demands. The drag input or the scroll input may be performed through a keyboard, a mouse, a wheel of a remote control, a track ball, or a touch pad.

In operation 540, the pupillary distance recognizing apparatus controls a viewing cone included in the 3D image. The pupillary distance recognizing apparatus 100 may control the viewing cone based on the control command of the user.

In operation 550, the pupillary distance recognizing apparatus 100 receives, from the user, a user feedback indicating whether an artifact is viewed in the 3D image. The user feedback may relate to a margin in which the artifact is viewable by the user when the eyes of the user deviate from an optimal viewing zone.

In operation 560, the pupillary distance recognizing apparatus 100 determines the optimal viewing zone based on the user feedback and the positions of the eyes of the user. The pupillary distance recognizing apparatus 100 may determine the margin based on the user feedback, and determine a viewing zone corresponding to the determined margin to be the optimal viewing zone.

In operation 570, the pupillary distance recognizing apparatus 100 matches a pupillary distance of the user to identification information of the user and stores the matched pupillary distance of the user. For example, when a plurality of users use the pupillary distance recognizing apparatus 100, the users and pupillary distances of the users may be distinguished by identification information of the users. When the users sequentially view 3D contents, each user may view 3D contents suitable for a pupillary distance of the user by inputting identification information of the user to the pupillary distance recognizing apparatus 100.

In operation 580, the pupillary distance recognizing apparatus 100 outputs a 3D image corresponding to the pupillary distance of the user. The 3D image to be output in operation 580 may be 3D contents such as, for example, a photograph, a television program, and a movie.

The user may measure a pupillary distance more conveniently and accurately using the example method. In addition, the user may view the 3D image optimal for the pupillary distance of the user and thus, a restriction on a movement may be relieved.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor (i.e., a special purpose processor), a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of recognizing a pupillary distance, comprising:
    generating a first reference three-dimensional (3D) image corresponding to a first pupillary distance, wherein the first reference 3D image has
    a first viewing zone associated with the first pupillary distance, and wherein a user views the first reference 3D image without an artifact caused by crosstalk of the first reference 3D image while the user moves within a margin of the first viewing zone;
    receiving a user feedback indicating whether the artifact is viewed in the first reference 3D image; and
    determining a pupillary distance of the user based on the user feedback.

2. The method of claim 1, further comprising:
    generating a second reference 3D image corresponding to a second pupillary distance in response to the artifact being viewed in the first reference 3D image.

3. The method of claim 1, wherein the determining the pupillary distance of the user comprises determining the first pupillary distance to be the pupillary distance of the user in response to the artifact being not viewed in the first reference 3D image.

4. The method of claim 1, further comprising:
    controlling a viewing cone of the first reference 3D image to move within the margin of the first viewing zone, and wherein the user feedback is received after the controlling of the viewing cone of the first reference 3D image.

5. The method of claim 4, wherein the viewing cone is controlled based on a command of the user.

6. An apparatus for recognizing a pupillary distance, comprising:
    a memory storing computer-readable instructions; and
    one or more processors configured to execute the computer-readable instructions such that the one or more processors are configured to,
        generate a first reference three-dimensional (3D) image corresponding to a first pupillary distance, wherein the first reference 3D image has
        a first viewing zone associated with the first pupillary distance, a user views the first reference 3D image without an artifact while the user moves within a margin of the first viewing zone;
        receive a user feedback indicating whether the artifact is viewed in the first reference 3D image; and
        determine a desired pupillary distance of the user based on the user feedback.

7. The apparatus of claim 6, wherein the one or more processors are configured to execute the computer-readable instructions such that the one or more processors are configured to,
    in response to the artifact being viewed in the first reference 3D image, generate a second reference 3D image corresponding to a second pupillary distance, and
    in response to the artifact being not viewed in the first reference 3D image, determine the first pupillary distance to be the pupillary distance of the user.

8. The apparatus of claim 6, wherein the one or more processors are configured to execute the computer-readable instructions such that the one or more processors are configured to,
    control a viewing cone of the first reference 3D image to move within the margin of the first viewing zone based on a command of the user, and
    wherein the user feedback is received after the controlling of the viewing cone of the first reference 3D image.

9. An apparatus for recognizing a pupillary distance, comprising:
    a display configured to output a reference three-dimensional (3D) image;
    a memory storing computer-readable instructions; and
    one or more processors configured to execute the computer-readable instructions such that the one or more processors are configured to,
        control the output of the reference 3D image,
        receive a user feedback indicating a timing at which an artifact begins to be viewed in the reference 3D image in response to the controlling of the output of the reference 3D image,
        set a boundary based on the user feedback,
        determine a viewing zone corresponding to the boundary, wherein a user views the reference 3D image without the artifact while the user moves within the boundary of the viewing zone, and
        determine a pupillary distance corresponding to the viewing zone to be a pupillary distance of the user.

10. The apparatus of claim 9, wherein the one or more processors are configured to execute the computer-readable instructions such that the one or more processors are configured to control the output of the reference 3D image by controlling a viewing cone of the reference 3D image based on a control command, the control command being based on an input of the user.

11. The apparatus of claim 10, wherein the one or more processors are configured to execute the computer-readable instructions such that the one or more processors are configured to move at least one of a left image and a right image of the viewing cone based on the control command.

12. The apparatus of claim 10, wherein the user feedback relates to the boundary in which the artifact is viewable by the user when eyes of the user deviate from the viewing zone, and wherein the one or more processors are configured to execute the computer-readable instructions such that the one or more processors are configured to determine the boundary based on the user feedback, and determine the viewing zone based on the boundary.

13. The apparatus of claim 10, wherein the one or more processors are configured to execute the computer-readable instructions such that the one or more processors are configured to control the viewing cone by moving a virtual eye position of the viewing cone.

14. The apparatus of claim 10, wherein the viewing cone comprises a left viewing cone to be radiated to a left eye of the user and a right viewing cone to be radiated to a right eye of the user, and the one or more processors are configured to execute the computer-readable instructions such that the one or more processors are configured to control the viewing cone by sequentially controlling the left viewing cone and the right viewing cone.

15. The apparatus of claim 9, further comprising:

a storage configured to store the pupillary distance of the user matched to identification information of the user.

* * * * *